United States Patent
Satou et al.

(10) Patent No.: US 9,528,867 B2
(45) Date of Patent: Dec. 27, 2016

(54) ULTRASONIC FLOW METER AND DAMPER ASSEMBLY FOR VIBRATION REDUCTION MOUNTING

(71) Applicant: Panasonic Intellectual Property Management Co., Ltd., Osaka (JP)

(72) Inventors: Masato Satou, Nara (JP); Hidetomo Nagahara, Kyoto (JP); Aoi Watanabe, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 79 days.

(21) Appl. No.: 14/438,632

(22) PCT Filed: Oct. 29, 2013

(86) PCT No.: PCT/JP2013/006374
§ 371 (c)(1),
(2) Date: Apr. 27, 2015

(87) PCT Pub. No.: WO2014/073181
PCT Pub. Date: May 15, 2014

(65) Prior Publication Data
US 2015/0292927 A1    Oct. 15, 2015

(30) Foreign Application Priority Data

Nov. 8, 2012 (JP) ................................. 2012-246150

(51) Int. Cl.
*G01F 1/66* (2006.01)
(52) U.S. Cl.
CPC ...................................... *G01F 1/66* (2013.01)

(58) Field of Classification Search
None
See application file for complete search history.

(56) References Cited

U.S. PATENT DOCUMENTS

| 6,895,825 B1* | 5/2005 | Barkhoudarian | ....... G01F 1/662 73/861.28 |
| 2012/0260742 A1* | 10/2012 | Mueller | .................. G01F 1/662 73/861.18 |

(Continued)

FOREIGN PATENT DOCUMENTS

| JP | 2001-159551 | 6/2001 |
| WO | 2011/061929 | 5/2011 |

(Continued)

OTHER PUBLICATIONS

International Search Report of PCT application No. PCT/JP2013/006374 dated Dec. 3, 2013.

*Primary Examiner* — Harshad R Patel
(74) *Attorney, Agent, or Firm* — Brinks Gilson & Lione

(57) ABSTRACT

An ultrasonic flow meter comprises a flow channel for a fluid to be measured to flow through, an ultrasonic transducer having an acoustic matching body and a piezoelectric element fixed to a metal plate, an insulating damping member which covers the metal plate except for the acoustic matching body, a mounting portion provided in the flow channel, and a fixing member that fixes the ultrasonic transducer to the mounting portion, The fixing member has a pressing portion and an extended portion, and the ultrasonic transducer is fixed to the mounting portion by engaging a hole disposed in the extended portion with a hook disposed on the mounting portion. This structure reduces through-the-case conduction, and achieves the ultrasonic flow meter of high accuracy.

6 Claims, 3 Drawing Sheets

(56) References Cited

U.S. PATENT DOCUMENTS

2012/0266690 A1    10/2012   Ozaki et al.
2013/0061686 A1    3/2013   Fujii et al.
2014/0033827 A1    2/2014   Satou et al.

FOREIGN PATENT DOCUMENTS

WO    2012/008151    1/2012
WO    2012/164879    12/2012

\* cited by examiner

ULTRASONIC FLOW METER AND DAMPER ASSEMBLY FOR VIBRATION REDUCTION MOUNTING

CROSS-REFERENCE TO RELATED APPLICATIONS

The present application is a U.S. national stage application of PCT International Application No. PCT/JP2013/006374 filed on Oct. 29, 2013, and claims the benefit of foreign priority to Japanese patent application 2012-246150 filed on Nov. 8, 2012, the contents all of which are incorporated by reference.

TECHNICAL FIELD

The present invention relates to an ultrasonic flow meter using an ultrasonic transducer to transmit ultrasonic waves into a fluid or to receive ultrasonic waves that travel in the fluid.

BACKGROUND ART

Ultrasonic transducers having a structure shown in FIG. 4 are hitherto disclosed, as the ultrasonic transducers used in ultrasonic flow meters of a certain kind (refer to Patent Literature 1, for example).

Description is provided hereinafter about a structure of a conventional ultrasonic transducer by referring to FIG. 4. FIG. 4 is a schematic drawing showing the conventional ultrasonic transducer in a position mounted on a flow channel.

As shown in FIG. 4, conventional ultrasonic transducer 68 includes closed-top cylindrical case 63, piezoelectric element 64, and retainer 66 formed from vibration damper 65 and vibration conduction suppressor 67 in a single-piece structure. Case 63 has top portion 60, sidewall 61, and support portion 62 extending outward from sidewall 61. Piezoelectric element 64 is fixed to an inner wall face of top portion 60 of case 63. Vibration damper 65 is so disposed as to cover and stay in close contact with an outer periphery of sidewall 61 of case 63, to suppress vibrations of sidewall 61 attributed to vibrations of piezoelectric element 64. Retainer 66 retains support portion 62 of case 63. Vibration conduction suppressor 67 of retainer 66 is generally formed of a flexible material having high damping properties, and it holds case 63 in vibration free to mounting portion 69a of flow channel 69. Ultrasonic transducer 68 is fixed to flow channel 69 with screw 71, while being held pressed against vibration conduction suppressor 67 of retainer 66 via sensor holder 70. With this structure, ultrasonic transducer 68 measures a flow rate of the fluid.

In a case that the ultrasonic transducer of the above structure is used for an ultrasonic flow meter, vibration conduction suppressor 67 of retainer 66 and ultrasonic transducer 68 are made up from separate parts. It is therefore necessary that vibration conduction suppressor 67 is attached into tight contact with ultrasonic transducer 68. There has been a problem of mass-productivity, however, that it requires a certain time for adjustment when vibration conduction suppressor 67 of pliable nature is attached uniformly to ultrasonic transducer 68.

There is also a case in which vibration conduction suppressor 67 does not adequately serve its intended function due to a variation in mounting accuracy of vibration conduction suppressor 67. Reverberant noise and vibrations that become noises in the measurement are therefore transmitted to flow channel 69 during the flow measurement. As a result, it gives rise to a drawback in which the noises conducted through the case increases, and measuring accuracy of the flow rate of the fluid decreases.

In addition, there is another case in which tightening torque of screw 71 is prone to vary when ultrasonic transducer 68 is mounted on flow channel 69 via sensor holder 70. This results in conduction of the vibrations of ultrasonic transducer 68 to flow channel 69. There is hence a possibility of increasing the conduction noises through the case, and decreasing the measuring accuracy of the flow rate of the fluid.

CITATION LIST

Patent Literature

PTL 1: Japanese Unexamined Patent Publication, No. 2001-159551

SUMMARY OF THE INVENTION

In order to resolve the problem discussed above, an ultrasonic flow meter of the present invention includes a flow channel configured to allow a fluid to be measured to flow through, an ultrasonic transducer having an acoustic matching body fixed to one side of a metal plate and a piezoelectric element fixed to another side of the metal plate, an insulating damping member configured to cover the metal plate except for the acoustic matching body, a mounting portion of the ultrasonic transducer provided in the flow channel, and a fixing member that fixes the ultrasonic transducer to the mounting portion. The fixing member includes a pressing portion of the ultrasonic transducer, and an extended portion of a cantilever shape disposed on an outer periphery of a main fixing member with a predetermined space. The ultrasonic transducer is fixed to the mounting portion via the extended portion.

With this structure, the extended portion functions as a damper to avoid vibrations of the ultrasonic transducer from being conducted directly to the flow channel, and to reduce conduction of the vibrations through the case. In addition, the extended portion can ensure positioning accuracy of mounting the ultrasonic transducer, thereby achieving the flow-rate measuring device capable of measuring a flow rate with high accuracy.

DESCRIPTION OF EMBODIMENT

Description is provided hereinafter of an exemplary embodiment of the present invention with reference to the accompanying drawings. Note that the scope of the present invention is not limited by this exemplary embodiment.

EXEMPLARY EMBODIMENT

Figure 1:
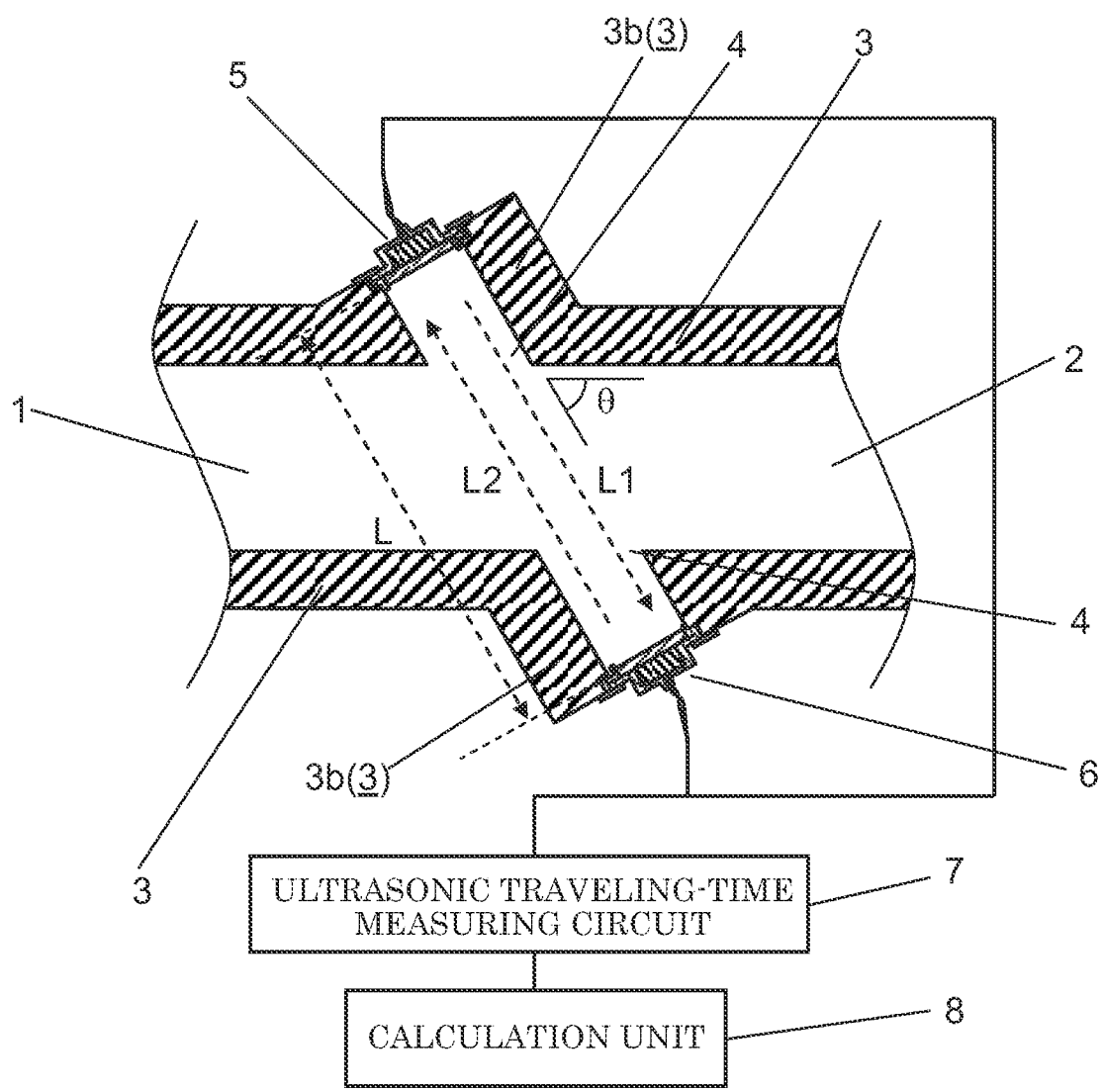
FIG. 1 is a sectional view of an ultrasonic flow meter, taken along a direction of flow, according to an exemplary embodiment of the present invention.

FIG. 1 is a sectional view of an ultrasonic flow meter, taken along a direction of flow, according to this exemplary embodiment of the present invention.

As shown in FIG. 1, the ultrasonic flow meter of this exemplary embodiment includes flow channel 3 having at least two openings 4, ultrasonic transducers 5 and 6 mounted in openings 4, and the like. Flow channel 3 is a pipe that allows a fluid to be measured (i.e., object fluid) such as gas to flow through from open end 1 at one side to another open end 2 at another side. Openings 4 of flow channel 3 are disposed at locations that are diagonally opposite to each other with respect to flow channel 3, and let ultrasonic wave travel, as it is transmitted and received. Ultrasonic transducers 5 and 6 are disposed in a confronting manner at outsides of openings 4 along an axis extended from openings 4.

In addition, the ultrasonic flow meter of this exemplary embodiment includes ultrasonic traveling-time measuring circuit 7, and calculation unit 8. Ultrasonic traveling-time measuring circuit 7 measures a traveling time of the ultrasonic wave that travels between the confronting pair of ultrasonic transducers 5 and 6. Calculation unit 8 calculates a flow rate of the object fluid based on the traveling time measured with ultrasonic traveling-time measuring circuit 7.

In the ultrasonic flow meter constructed as above, description is provided more specifically about a method for measuring the flow rate and flow velocity of the object fluid with reference to FIG. 1, as follows.

Note that "L1" marked in FIG. 1 indicates a traveling path of the ultrasonic wave that travels from ultrasonic transducer 5 disposed on the upstream side to ultrasonic transducer 6. On the other hand, "L2" marked in FIG. 1 indicates a traveling path of the ultrasonic wave that travels from ultrasonic transducer 6 disposed on the downstream side to ultrasonic transducer 5.

Here, a flow velocity of the fluid that flows in flow channel 3, a traveling velocity of the ultrasonic wave in the fluid, and an angle formed between a flowing direction of the fluid and a traveling direction of the ultrasonic wave are denoted respectively by V, C, and θ.

In this instance, when ultrasonic transducer 5 is assigned to be a transmitting side, and ultrasonic transducer 6 a receiving side, then a traveling time t1 for an ultrasonic pulse transmitted from ultrasonic transducer 5 to reach ultrasonic transducer 6 is given by the following equation (1):

$$t1 = L/(C + V \cos \theta) \tag{1}$$

On the other hand, when ultrasonic transducer 6 is assigned to be a transmitting side and ultrasonic transducer 5 a receiving side, then a traveling time t2 for an ultrasonic pulse transmitted from ultrasonic transducer 6 to reach ultrasonic transducer 5 is given by the following equation (2):

$$t2 = L/(C - V \cos \theta) \tag{2}$$

The velocity C of ultrasonic wave in the fluid can be eliminated from the equation (1) for traveling time t1 and the equation (2) for traveling time t2, and the following equation (3) is thus obtained:

$$V = L/2 \cos \theta (1/t1 - 1/t2) \tag{3}$$

As is apparent form the equation (3), flow velocity V of the fluid can be obtained by using the traveling times t1 and t2 measured with ultrasonic traveling-time measuring circuit 7, when distance L between ultrasonic transducers 5 and 6 and angle θ are known.

Calculation unit 8 can hence obtain flow rate Q as needed, by multiplying the flow velocity V obtained from the above equation by sectional area S of flow channel 3 and correction factor K, according to the following equation (4):

$$Q = K \times S \times V \tag{4}$$

As a result, flow rate Q of the fluid can be measured by using the ultrasonic flow meter of this exemplary embodiment.

Figure 2A:
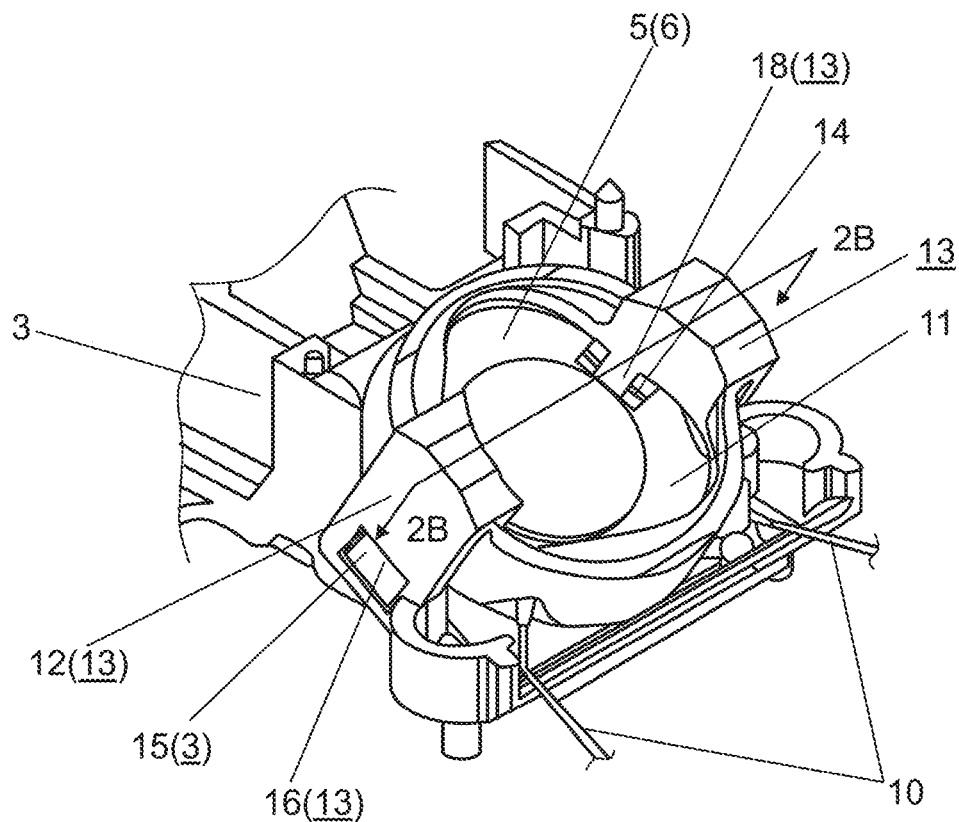
FIG. 2A is a perspective view of an ultrasonic transducer and a structure of mounting it to a flow channel, according to this exemplary embodiment of the invention.
Figure 2B:
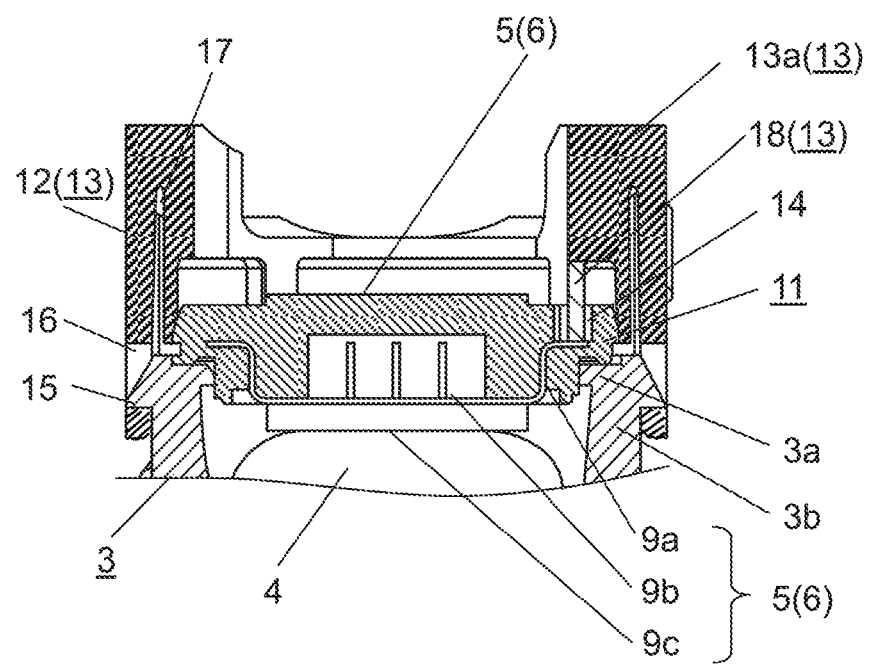
FIG. 2B is a sectional view taken along a line 2B-2B of FIG. 2A.

Referring to FIG. 2A and FIG. 2B, description is provided hereinafter in details about a mounting structure of the ultrasonic transducer to the flow channel and a structure of the ultrasonic transducer that are the main points of this exemplary embodiment. Note that the description given below is an example of ultrasonic transducer 5, but obviously, the same applies also to ultrasonic transducer 6.

FIG. 2A is a perspective view of the ultrasonic transducer mounted to the flow channel according to this exemplary embodiment, and FIG. 2B is a sectional view taken along a line 2B-2B of FIG. 2A.

As shown in FIG. 2A and FIG. 2B, ultrasonic transducer 5 includes at least acoustic matching body 9c, metal plate 9a, piezoelectric element 9b, insulating damping member 11, and two lead wires 10. Acoustic matching body 9c is bonded and fixed to one side (i.e., a surface confronting the fluid that flows in flow channel 3) of metal plate 9a with an adhesive, for instance. On the other hand, piezoelectric element 9b is bonded and fixed to the other side of metal plate 9a with an adhesive or a conductive paste, for instance. One of lead wires 10 is electrically connected to an electrode of piezoelectric element 9b, i.e., the electrode that is not bonded to metal plate 9a. The other lead wire 10 is electrically connected via metal plate 9a to another electrode of piezoelectric element 9b, i.e., the electrode bonded to metal plate 9a. In this instance, the connections of lead wires 10 to piezoelectric element 9b and metal plate 9a are made by soldering or with a conductive paste and the like. In this case, metal plate 9a and the electrode of piezoelectric element 9b are connected electrically by ohmic contact when the adhesive is used in the bonded portion.

Acoustic matching body 9c is constructed from a hollow spherical body made of a glass, of which a space is filled with a thermosetting resin, for instance, and hardened. Acoustic matching body 9c may instead be made of a porous ceramic with an acoustic film formed on a sound-wave radiating surface. Acoustic matching body 9c of this structure is formed into a thickness adjusted to λ/4 (λ represents a wavelength of the ultrasonic wave). With this structure, the ultrasonic wave can be propagated efficiently into the object fluid.

Metal plate 9a is made of one of materials selected from iron, stainless steel, brass, copper, aluminum, and nickel-plated steel, for instance, though it can be any other material as long as it is a metallic material.

Piezoelectric element 9b may be made of any piezoelectric material that exhibits a piezoelectric effect, although it is especially preferable to use such a material as barium titanate or lead zirconate titanate.

Insulating damping member 11 is so formed that it covers an outer periphery of piezoelectric element 9b. At the same time, insulating damping member 11 covers one side of metal plate 9a that is in contact with flow channel 3, and also the other side of metal plate 9a on which piezoelectric element 9b is disposed. As shown, insulating damping member 11 is formed integrally with metal plate 9a and piezoelectric element 9b, and it can thus provide an adequate strength of adhesion.

Ultrasonic transducer 5 of this exemplary embodiment is constructed as described above.

Ultrasonic transducer 5 is fixed via insulating damping member 11 to flow-channel contact face 3a provided on mounting portion 3b formed around opening 4 of flow channel 3, as shown in FIG. 2B. In this instance, fixing of ultrasonic transducer 5 to mounting portion 3b of flow channel 3 is made by using fixing member 13 which is compressed against flow-channel contact face 3a around opening 4 of flow channel 3, details of which will be described later.

Ultrasonic transducer 5 is provided with void portion 14 where insulating damping member 11 is not formed, and metal plate 9a is exposed in void portion 14.

Figure 3:
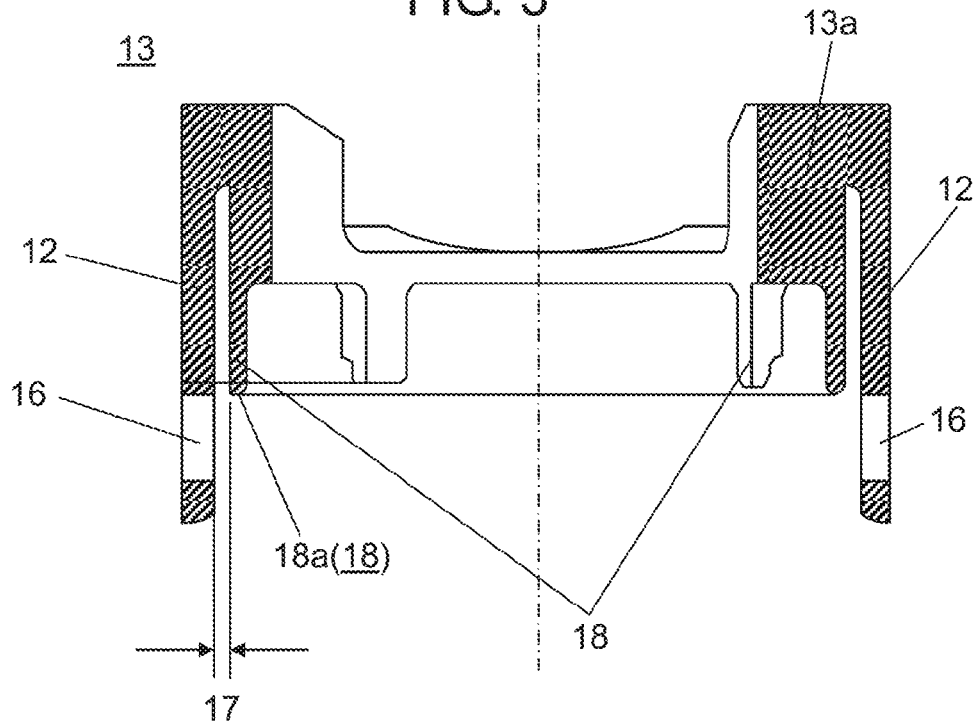
FIG. 3 is a sectional view of a fixing member according to this exemplary embodiment of the invention.
Figure 4:
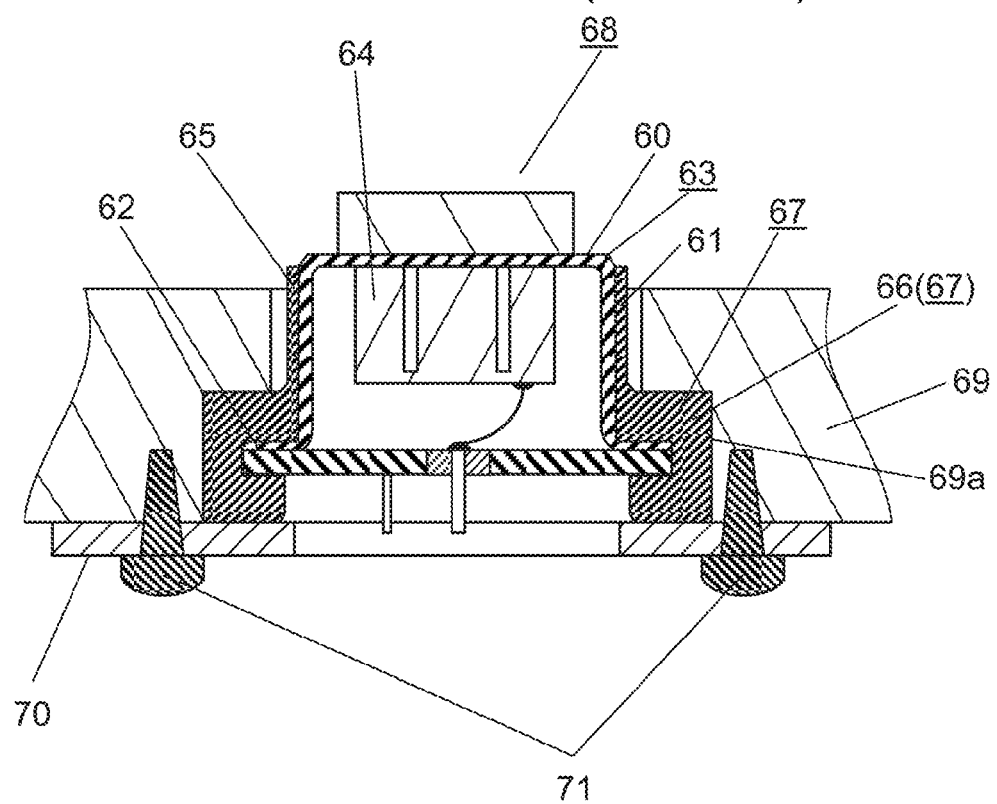
FIG. 4 is a schematic drawing showing a conventional ultrasonic transducer in a mounted state.

Description is provided in details about a structure and construction of the above fixing member 13 by referring to FIG. 3.

FIG. 3 is a sectional view of fixing member 13 according to this exemplary embodiment.

As shown in FIG. 3, fixing member 13 is constructed to have main fixing member 13a, pressing portion 18 that is held pressed against metal plate 9a in void portion 14 of ultrasonic transducer 5, and extended portion 12 of a cantilever shape (e.g., a shape of letter L) having space 17 of a predetermined distance disposed on an outer periphery of main fixing member 13a. Here, extended portion 12 is formed to extend far below lower end 18a of pressing portion 18. Space 17 is formed from proximity of an upper part of main fixing member 13a toward lower end 18a of pressing portion 18.

There exists hole 16 formed in the vicinity of an end of extended portion 12, and configured to work as a catch, which engages with hook 15 shown in FIG. 2B configured to work as a latch and disposed in the vicinity of an end of mounting portion 3b of flow channel 3. Ultrasonic transducer 5 is thus fixed to mounting portion 3b of flow channel 3.

The ultrasonic transducer constructed as above operates in such a manner and with such effect and advantages as described hereinafter by referring to FIG. 1 through FIG. 2B.

In the ultrasonic transducer of this exemplary embodiment, an electric signal is applied first to piezoelectric element 9b from ultrasonic traveling-time measuring circuit 7 through lead wires 10 that are connected electrically with piezoelectric element 9b. In this case, a rectangular wave signal of a frequency close to a resonant frequency of piezoelectric element 9b, for instance, is applied as the electric signal. This electric signal drives piezoelectric element 9b, and converts the signal into mechanical vibrations.

Subsequently, piezoelectric element 9b and acoustic matching body 9c resonate, and this causes an ultrasonic pulse of a larger magnitude to travel through opening 4 and propagate into the object fluid that is flowing in flow channel 3.

At this time, insulating damping member 11 performs the following two functions. The first function is to prevent vibrations, which occur when the ultrasonic pulse propagates into the object fluid, from being transferred to flow channel 3. The second function is to damp vibrations of piezoelectric element 9b as well as vibrations of metal plate 9a that receives the vibrations of piezoelectric element 9b, and to shorten duration of reverberation that becomes a noise during measurement. It is for this reason that insulating damping member 11 is configured to cover the outer peripheries of piezoelectric element 9b and metal plate 9a.

In addition, extended portion 12 of fixing member 13 has the function of a damper by virtue of the following structure. That is, extended portion 12 damps the vibrations from pressing portion 18 of fixing member 13 that presses metal plate 9a of ultrasonic transducer 5, and impedes through-the-case conduction of the vibrations to flow channel 3. In specific, the vibrations conducted from pressing portion 18 of fixing member 13 travel to hole 16 after being forced to detour around space 17 by extended portion 12 that forms a part of fixing member 13, and reach hook 15 provided on mounting portion 3b of flow channel 3. With this structure, the vibrations that propagate from pressing portion 18 of fixing member 13 to flow channel 3 can be damped.

Furthermore, since extended portion 12 makes fixing member 13 easily and elastically deformable, hook 15 provided on mounting portion 3b of flow channel 3 can be insert easily in hole 16 formed in extended portion 12. The ultrasonic transducer can be thus installed easily in mounting portion 3b of flow channel 3. As a result, the structure can improve workability and achieve high productivity.

It is preferable to configure extended portion 12 so that it has a natural frequency outside of a vibration frequency of ultrasonic transducer 5, though no specific figure has been described in this exemplary embodiment. For example, extended portion 12 of the shape of letter L, or the cantilever shape, may be formed to have the natural frequency that falls outside of the vibration frequency of ultrasonic transducer 5, by designing the shape such as a length and thickness of extended portion 12, and adjusting modulus of elasticity of the structural material. It becomes possible with this structure to prevent extended portion 12 from resonating with the vibration frequency of ultrasonic transducer 5, and to effectively suppress conduction of the vibrations.

In this exemplary embodiment, although no information has been described specifically about a material to construct extended portion 12, it may be constructed of an elastic material having damping effect such as a rubber-based nitrile butadiene rubber (NBR) and silicone, or a material having elasticity. With this structure, the vibrations of piezoelectric element 9b of ultrasonic transducer 5 conducted from pressing portion 18 of fixing member 13 can be damped effectively. As a result, this structure can avert decrease in the accuracy of measuring a flow rate of the fluid, and achieve the flow-rate measuring device capable of measuring the flow rate with high accuracy.

Furthermore, although the description provided in this exemplary embodiment is the structure provided with hole 16 in extended portion 12 of fixing member 13 and hook 15 on mounting portion 3b of flow channel 3, this is not restrictive. Instead, a hook that works as a latch may be provided on extended portion 12 of fixing member 13, and a hole that works as a catch may be provided in mounting portion 3b of flow channel 3, for instance. This increases a degree of designing flexibility.

According to the present invention, as described above, the ultrasonic flow meter is provided with a flow channel configured to allow an object fluid to flow, an ultrasonic transducer having an acoustic matching body fixed to one side of a metal plate and a piezoelectric element fixed to another side of the metal plate, an insulating damping member configured to cover the metal plate except for the acoustic matching body, a mounting portion of the ultrasonic transducer provided in the flow channel, and a fixing member that fixes the ultrasonic transducer to the mounting portion. The fixing member has a structure that includes a pressing portion of the ultrasonic transducer, and an extended portion of a cantilever shape having a predetermined space disposed on an outer periphery of a main fixing member, so that the ultrasonic transducer can be fixed to the mounting portion via the extended portion.

With this structure, the extended portion functions as a damper to avoid vibrations of the ultrasonic transducer from being conducted directly to the flow channel, and to reduce through-the-case conduction of the vibrations. In addition, the extended portion can ensure positioning accuracy of mounting the ultrasonic transducer. The structure can hence achieve the flow-rate measuring device capable of measuring the flow rate with high accuracy.

According to the ultrasonic flow meter of the present invention, a natural frequency of the extended portion may be set different from the vibration frequency of the ultrasonic transducer.

As a result, propagation of the vibrations of the ultrasonic transducer toward the flow channel can be reduced.

According to the ultrasonic flow meter of the present invention, the fixing member may have such a length from the face in contact with the ultrasonic transducer to the extended portion that it does not resonate with the vibration frequency of the ultrasonic transducer.

This structure can damp the vibrations of the ultrasonic transducer, and impede the through-the-case conduction of the vibrations toward the flow channel.

According to the ultrasonic flow meter of the present invention, the extended portion may be constructed of a material that does not resonate with the vibration frequency of ultrasonic transducer.

This structure can effectively suppress the vibrations of the ultrasonic transducer that are conducted directly to the flow channel side.

Moreover, according to the ultrasonic flow meter of the present invention, the shape of the extended portion may be configured to be a shape having the natural frequency falling outside the vibration frequency of ultrasonic transducer.

This structure helps impede resonance of the extended portion of the fixing member attributed to the vibrations of the ultrasonic transducer, and it can hence reduce through-the-case conduction of the vibrations to the flow channel.

Furthermore, according to the present invention, the ultrasonic flow meter may include a confronting pair of ultrasonic transducers, one each at the upstream side and the downstream side of the flow channel, an ultrasonic traveling-time measuring circuit for measuring a traveling time of an ultrasonic wave from transmission by one of the pair of ultrasonic transducers until the ultrasonic wave to reception by another one of the pair of ultrasonic transducers, and a calculation unit for calculating a flow rate of the object fluid based on the traveling time.

It hence becomes possible to achieve the ultrasonic flow meter capable of measuring the flow rate highly accurately.

INDUSTRIAL APPLICABILITY

The present invention is applicable for use in ultrasonic flow meters for which high mass-productivity and high accuracy in flow measurement are required, such as home use flow meters and business use flow meters.

REFERENCE MARKS IN THE DRAWINGS 1 open end
2 another open end
3, 69 flow channel
3a flow-channel contact face
3b, 69a mounting portion
4 opening
5, 6, 68 ultrasonic transducer
7 ultrasonic traveling-time measuring circuit
8 calculation unit
9a metal plate
9b, 64 piezoelectric element
9c acoustic matching body
10 lead wire
11 insulating damping member
12 extended portion
13 fixing member
13a main fixing member
14 void portion
15 hook (latch)
16 hole (catch)
17 space
18 pressing portion
18a lower end
60 top portion
61 sidewall
62 support portion
63 case
65 vibration damper
66 retainer
67 vibration conduction suppressor
71 screw

The invention claimed is:

1. An ultrasonic flow meter comprising:
a flow channel configured for a fluid to be measured to flow through;
an ultrasonic transducer having an acoustic matching body fixed to one side of a metal plate, and a piezoelec element fixed to another side of the metal plate;
an insulating damping member configured to cover the metal plate except for the acoustic matching body;
a mounting portion which is a part of the flow channel is provided for coupling to a fixing member of the ultrasonic transducer,
wherein the fixing member includes a pressing portion which through applying pressure, couples and fixes the ultrasonic transducer in place to the mounting portion, and
wherein the pressing portion of the fixing member includes an extended portion having a cantilever shape to form a main fixing member with a predetermined space for coupling to the mounting portion of the flow channel, and the extended portion is disposed on an outer periphery of the pressing portion of the fixing member, and
wherein the ultrasonic transducer is fixed in place to the mounting portion of the flow channel via coupling to the extended portion.

2. The ultrasonic flow meter according to claim 1, wherein a natural frequency of the extended portion is different from a vibration frequency of the ultrasonic transducer.

3. The ultrasonic flow meter according to claim 1, wherein the fixing member has a length from a face in contact with the ultrasonic transducer to the extended portion such that the length does not resonate with a vibration frequency of the ultrasonic transducer.

4. The ultrasonic flow meter according to claim 1, wherein the extended portion is made of a material that does not resonate with a vibration frequency of the ultrasonic transducer.

5. The ultrasonic flow meter according to claim 1, wherein the extended portion is configured to be a shape having a natural frequency falling outside a vibration frequency of the ultrasonic transducer.

6. The ultrasonic flow meter according to claim 1 further comprising:
- a pair of the ultrasonic transducers disposed opposite to each other at an upstream side and a downstream side of the flow channel;
- an ultrasonic traveling-time measuring circuit configured to measure a traveling time of an ultrasonic wave from transmission by one of the pair of ultrasonic transducers to reception by another of the pair of ultrasonic transducers; and
- a calculation unit configured to calculate a flow rate of the fluid to be measured based on the traveling time.

* * * * *